(12) United States Patent
Miralles et al.

(10) Patent No.: US 8,462,208 B2
(45) Date of Patent: Jun. 11, 2013

(54) SYSTEM AND METHOD FOR TRIDIMENSIONAL CARTOGRAPHY OF A STRUCTURAL SURFACE

(75) Inventors: François Miralles, Montréal (CA); Régis Houde, Sainte-Julie (CA); Julien Beaudry, Châteauguay (CA); Bruce Hazel, Montréal (CA); Jean Côté, Sainte-Julie-de-Verchères (CA); Michel Blain, Saint-Amable (CA); Serge Sarraillon, Varennes (CA)

(73) Assignee: Hydro-Quebec, Montreal, Quebec (CA)

( * ) Notice: Subject to any disclaimer, the term of this patent is extended or adjusted under 35 U.S.C. 154(b) by 630 days.

(21) Appl. No.: 12/734,034

(22) PCT Filed: Oct. 8, 2008

(86) PCT No.: PCT/CA2008/001769
§ 371 (c)(1),
(2), (4) Date: Apr. 5, 2010

(87) PCT Pub. No.: WO2009/046519
PCT Pub. Date: Apr. 16, 2009

(65) Prior Publication Data
US 2010/0238269 A1    Sep. 23, 2010

(51) Int. Cl.
*G01B 11/30* (2006.01)
*G01B 11/24* (2006.01)
*H04N 7/18* (2006.01)

(52) U.S. Cl.
USPC ........... 348/136; 348/137; 348/131; 348/142; 348/135; 356/603; 356/604; 356/601

(58) Field of Classification Search
None
See application file for complete search history.

(56) References Cited

U.S. PATENT DOCUMENTS

| | | | |
|---|---|---|---|
| 4,175,862 A | 11/1979 | DiMatteo et al. | |
| 4,294,544 A | 10/1981 | Altschuler et al. | |
| 4,492,471 A * | 1/1985 | Wiklund | 356/622 |
| 4,612,797 A | 9/1986 | Barkhoudarian | |
| 4,811,250 A * | 3/1989 | Steber et al. | 702/152 |
| 4,981,353 A | 1/1991 | Murakawa et al. | |
| 5,162,861 A * | 11/1992 | Tamburino et al. | 356/5.05 |

(Continued)

FOREIGN PATENT DOCUMENTS

| | | |
|---|---|---|
| EP | 1 062 478 B1 | 6/2005 |
| WO | WO 2004/011876 A1 | 2/2004 |

*Primary Examiner* — Sath V Perungavoor
*Assistant Examiner* — Matthew J Anderson
(74) *Attorney, Agent, or Firm* — Muirhead and Saturnelli, LLC (57) ABSTRACT

System and method for tridimensional cartography of a structural surface. Two wires are extended in front and along the structural surface so as to define a reference surface. A measuring unit comprising a laser arrangement and a camera is moved in front of the structural surface so as to progressively scan the surface. Tow distinct light planes directed toward the structural surface are projected by means of the laser arrangement. Images of the structural surface containing lines resulting from an intersection of the light planes with the structural surface and four reference points resulting from an intersection of the light planes with the wires are captured by means of the camera. The images are processed to determine the 3D coordinates of the lines defining the mapping in a reference system bound to the reference surface considering the position and the orientation of the measuring unit based on the reference points.

16 Claims, 9 Drawing Sheets

U.S. PATENT DOCUMENTS

| | | | |
|---|---|---|---|
| 5,679,899 A | 10/1997 | Webster et al. | |
| 5,898,181 A * | 4/1999 | Vurens | 250/559.28 |
| 6,122,541 A * | 9/2000 | Cosman et al. | 600/426 |
| 6,268,923 B1 * | 7/2001 | Michniewicz et al. | 356/512 |
| 6,379,043 B1 * | 4/2002 | Zylka et al. | 378/207 |
| 6,510,244 B2 * | 1/2003 | Proesmans et al. | 382/203 |
| 6,549,288 B1 * | 4/2003 | Migdal et al. | 356/603 |
| 6,574,050 B1 * | 6/2003 | Lin et al. | 359/668 |
| 6,577,405 B2 * | 6/2003 | Kranz et al. | 356/601 |
| 6,608,913 B1 * | 8/2003 | Hinton et al. | 382/104 |
| 6,610,992 B1 * | 8/2003 | Macaulay et al. | 250/559.22 |
| 6,677,941 B2 * | 1/2004 | Lin | 345/419 |
| 6,703,634 B2 * | 3/2004 | Ono | 250/559.19 |
| 6,714,307 B2 * | 3/2004 | De Groot et al. | 356/512 |
| 6,823,737 B2 * | 11/2004 | Kepler et al. | 73/602 |
| 6,885,479 B1 * | 4/2005 | Pilu | 358/474 |
| 7,075,661 B2 * | 7/2006 | Petty et al. | 356/603 |
| 7,248,344 B2 * | 7/2007 | Morcom | 356/10 |
| 7,253,908 B2 | 8/2007 | Vaccaro et al. | |
| 7,259,871 B2 | 8/2007 | Chen | |
| 7,336,375 B1 * | 2/2008 | Faul et al. | 356/604 |
| 7,345,757 B2 | 3/2008 | Penza | |
| 7,352,455 B2 * | 4/2008 | Groothuis et al. | 356/155 |
| 7,392,151 B2 * | 6/2008 | Makela | 702/150 |
| 7,471,384 B2 * | 12/2008 | Nomaru et al. | 356/241.1 |
| 7,489,408 B2 * | 2/2009 | Harding et al. | 356/603 |
| 7,609,388 B2 * | 10/2009 | Arieli et al. | 356/512 |
| 7,747,312 B2 * | 6/2010 | Barrick et al. | 600/426 |
| 7,768,656 B2 * | 8/2010 | Lapa et al. | 356/603 |
| 7,899,221 B2 * | 3/2011 | Weber et al. | 382/128 |
| 7,912,673 B2 * | 3/2011 | Hebert et al. | 702/153 |
| 7,995,834 B1 * | 8/2011 | Knighton et al. | 382/154 |
| 8,014,002 B2 * | 9/2011 | Keshavmurthy et al. | 356/610 |
| 2003/0164952 A1 * | 9/2003 | Deichmann et al. | 356/603 |
| 2006/0018642 A1 | 1/2006 | Chaplin | |
| 2006/0093206 A1 | 5/2006 | Rubbert et al. | |
| 2007/0115484 A1 * | 5/2007 | Huang et al. | 356/604 |
| 2007/0206204 A1 | 9/2007 | Jia et al. | |
| 2008/0055588 A1 | 3/2008 | Nomaru et al. | |
| 2008/0088848 A1 | 4/2008 | Bamba et al. | |

* cited by examiner

SYSTEM AND METHOD FOR TRIDIMENSIONAL CARTOGRAPHY OF A STRUCTURAL SURFACE

FIELD OF THE INVENTION

The invention relates to a system and a method for tridimensional cartography of a structural surface likely to be submerged.

BACKGROUND

The maintenance of a hydroelectric dam requires the inspection and repair of structures that may be submerged. A simple visual inspection from images or videos may provide qualitative information. This type of inspection allows for example verifying the surface state of the structures or detecting the presence of cracks. However, to establish a more workable evaluation of the state of the installations, it is necessary to have quantitative information. Such information allows, for example, not only detecting cracks but also accurately locating and gauging them, or establishing the complete survey of a structure to estimate its deformation.

The inspection of an underwater structure may be achieved in different ways. A first solution consists in sending divers to take spatial measurements of the structure. The execution of the inspection is then subjected to several constraints. The area must first be physically accessible and this access must be authorized by the safety rules. The environment of a dam indeed piles up the dangers of the underwater environment and the industrial environment. The divers then need enough visibility to be able to take the measurements. The water may be clouded by particles in suspension coming from the vegetation, aquatic organisms or the corrosion of metallic pieces. Furthermore, the quality of the measurements depends on the skill and the experience of the divers. Since the taking of the measurement is manual, the results comprise no notion of confidence or uncertainty. Finally, the time needed for the taking of a measurement may be long whereas the stopping of a part of a dam during the inspection may be very expensive for the operator. All of these constraints result in that the installations that require it are not always regularly inspected. In that case, the state of the dam deteriorates until the day one of its parts malfunctions. To sum up, an inspection with divers is not always possible, has a high cost, exhibits dangers for the human life and limits a rigorous quantitative use of the results.

A second solution for the underwater inspection resides in the use of a robotic system. In general, it may be any remote-controlled or autonomous system allowing collecting the data required for the inspection. In that class are found the mobile robots such as the ROV ("Remotely Operated Vehicle") and the AUV ("Autonomous Underwater Vehicle"). The use of a robot provides numerous advantages and new capabilities with respect to an inspection with divers. The safety requirements are not the same since no operator is directly present in the area to be inspected. The data may be collected by a larger number of various sensors: camera, video camera but also sonar, passive or active vision system. It is possible to combine the use of these sensors to take the measurements in different conditions. For example, the use of a vision system provides a good accuracy for a local inspection but an acoustic system allows collecting data over a larger range and in bad visibility conditions. The filtering and merging of the measurements coming from several sensors may reduce their uncertainty. The amount of collected data is greater. By having a sufficient measurement density, the risks of not detecting an irregularity are lower. A greater acquisition capacity makes large scale structure inspection also possible. It is for these reasons that the underwater robots are actively developed since over thirty years. The maturity of the technology now makes their use possible in the industry.

The robotized inspection systems comprise numerous advantages but their tuning poses new problems and their functioning may fail in certain specific conditions.

Although the data can be collected with different types of sensors, each sensor is efficient for a particular purpose.

One of the common problems of the underwater robots is the accurate positional tracking of the system. Yet, to be usable, the collected data need to be referenced in a same global reference system. However, on the outskirts of a dam, a robot sometimes operates in a closed environment, which may bring its position tracking system to a fault. For example, in the case of acoustic systems, the emitted waves bounce back on the walls and adversely affect the interpretation of the reflected signal. Or in the case of compasses, the earth magnetic field is distorted by the presence of the reinforcements of the concrete and prevents a good reading of the orientation.

The inspection of certain structures requires high measurement accuracy. Therefore, it is both necessary that the sensor that effectively performs the measurement be accurate and that the position tracking system of the robot be also accurate. Currently, a data measurement accuracy expressed in a global reference system in the order of the centimeter is generally reached, which is inadequate for certain applications.

It should be noted that a high measurement accuracy is not enough. A confidence level in the measurement is also required. This confidence level indicates the reliability of the system and depends of both the position tracking system and the sensor that performs the measurement.

An inspection system intended for on-site operation is subjected to perturbations commonly found in the environment (particles in suspension, vibrations, impacts). Thus, even if the system has a good measurement accuracy in ideal conditions, this accuracy will degrade in real conditions.

SUMMARY

An object of the present invention is to provide a system and a method allowing mapping a structural surface likely to be submerged, which simplify the tracking of the measuring unit with respect to the surface.

Another object of the present invention is to provide such a system and a such a method which allow establishing a depth map of the structural surface with a level of accuracy that may reach a fraction of a millimeter, for example 0.1 mm.

Another object of the present invention is to provide such a system and such a method capable of determining if a measurement is valid and able to associate a representation of uncertainty to a measurement if desired.

Another object of the present invention is to provide such a system having a robustness allowing using it in an underwater environment in possibly harsh conditions, and a reduced sensitivity to perturbations such as particles in suspension, vibrations, impacts.

Another object of the present invention is to provide such a system having a certain autonomy of operation.

Another object of the present invention is to provide such a system and such a method having a degree of versatility such that they are rather easily usable or practicable, and may self-calibrate.

Another object of the present invention is to provide such a system and such a method that allow fast taking of measurements.

According to an aspect of the present invention, there is provided a system for tridimensional cartography of a structural surface, comprising:

two wires extendable along the structural surface while being spaced from each other so as to define a reference surface in front of the structural surface;

a measuring unit comprising a laser arrangement configured to project two distinct light planes directed toward the structural surface and crossing the wires, and a camera configured to capture images of the structural surface containing lines resulting from an intersection of the light planes with the structural surface and reference points resulting from an intersection of the light planes with the wires;

a support assembly configured to controllably move the measuring unit in front of the structural surface so as to progressively scan the structural surface to be mapped; and a processing unit for processing the images captured by the camera, the processing unit having:

a processing circuit that determines an orientation and a position of the measuring unit with respect to the reference surface as function of the reference points in the images;

a processing circuit that determines 3D coordinates of points defining the lines in the images with respect to a reference system bound to the measuring unit determined as function of the orientation and the position of the measuring unit; and a processing circuit that transforms the 3D coordinates into cartographic data representative of the structural surface in a global reference system bound to the reference surface defined by the wires.

According to another aspect of the present invention, there is provided a method for tridimensional cartography of a structural surface, comprising the steps of:

a) extending two wires along the structural surface while spacing them from each other so as to define a reference surface in front of the structural surface;

b) controllably moving a measuring unit comprising a laser arrangement and a camera in front of the structural surface so as to progressively scan the structural surface;

c) projecting two distinct light planes directed toward the structural surface using the laser arrangement;

d) capturing images of the structural surface containing lines resulting from an intersection of the light planes with the structural surface and four reference points resulting from an intersection of the light planes with the wire using the camera;

e) determining an orientation and a position of the measuring unit with respect to the reference surface as function of the reference points in the images;

f) determining 3D coordinates of points defining the lines in the images with respect to a reference system bound to the measuring unit determined as function of the orientation and the position of the measuring unit; and g) transforming the 3D coordinates into cartographic data representative of the structural surface in a reference system bound to the reference surface defined by the wires.

BRIEF DESCRIPTION OF THE DRAWINGS

A detailed description of the preferred embodiments of the invention will be given hereinbelow with reference to the following drawings, in which like numbers refer to like elements.

DETAILED DESCRIPTION OF THE PREFERRED EMBODIMENTS

Figure 1:
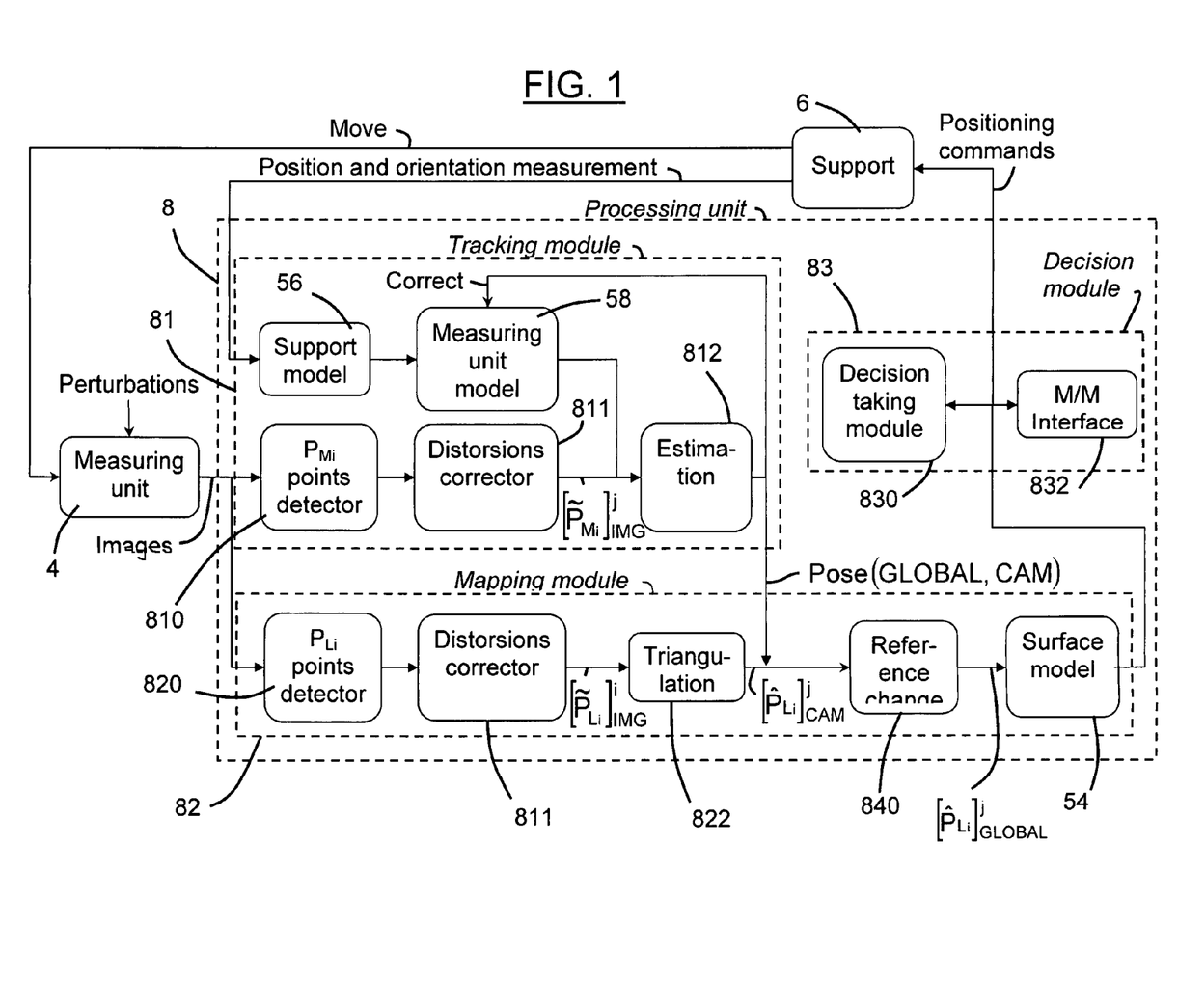
FIG. 1 is a schematic diagram illustrating a system for producing cartographic data of a structural surface according to the invention.

Referring to FIG. 1, there is shown a diagram of the system for tridimensional cartography of a structural surface 2 (shown in FIG. 3) according to the invention. The system comprises a measuring unit 4, a support assembly 6 configured to move the measuring unit 4, and a processing unit 8 connected to the measuring unit 4 and to the support assembly 6.

Figure 3:
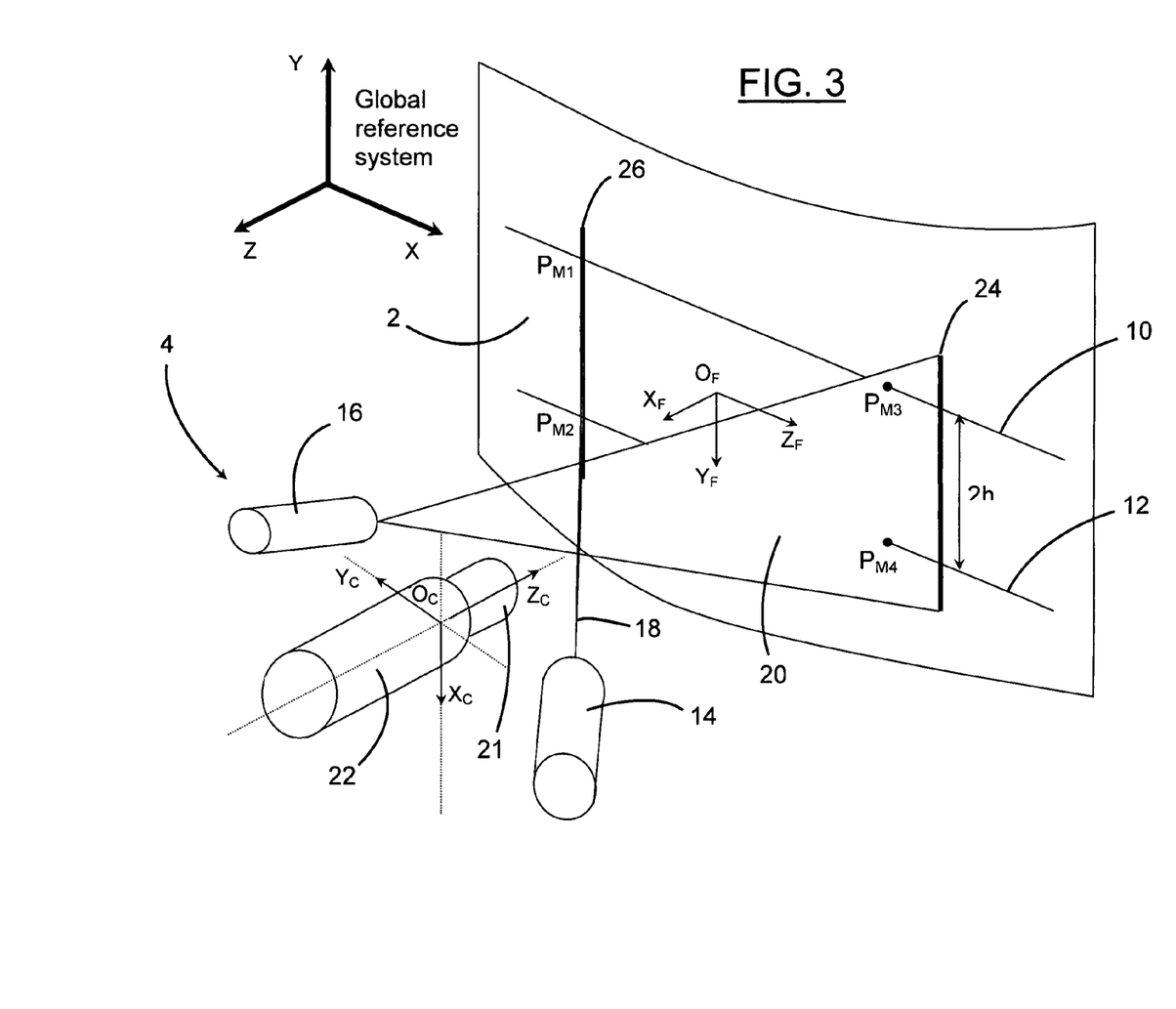
FIG. 3 is a schematic diagram illustrating a measuring unit of the system.

Referring to FIG. 3, the system also comprises two wires 10, 12 in parallel and extendable along the structural surface 2 while being spaced from each other so as to define a reference surface in front of the structural surface 2. The measuring unit 4 comprises a laser arrangement formed of two lasers 14, 16 configured to project two distinct light planes 18, 20 directed toward the surface 2, and a camera 22 provided with a lens 21. In the case where the wires 10, 12 form a reference surface that is not planar or in the case where the wires 10, 12 are not in parallel, the out-of-parallelism or flatness defect relative to the measuring unit 4 will be used to bring the desired corrections to the measurements performed by the processing unit 8 (shown in FIG. 1).

Figure 6:
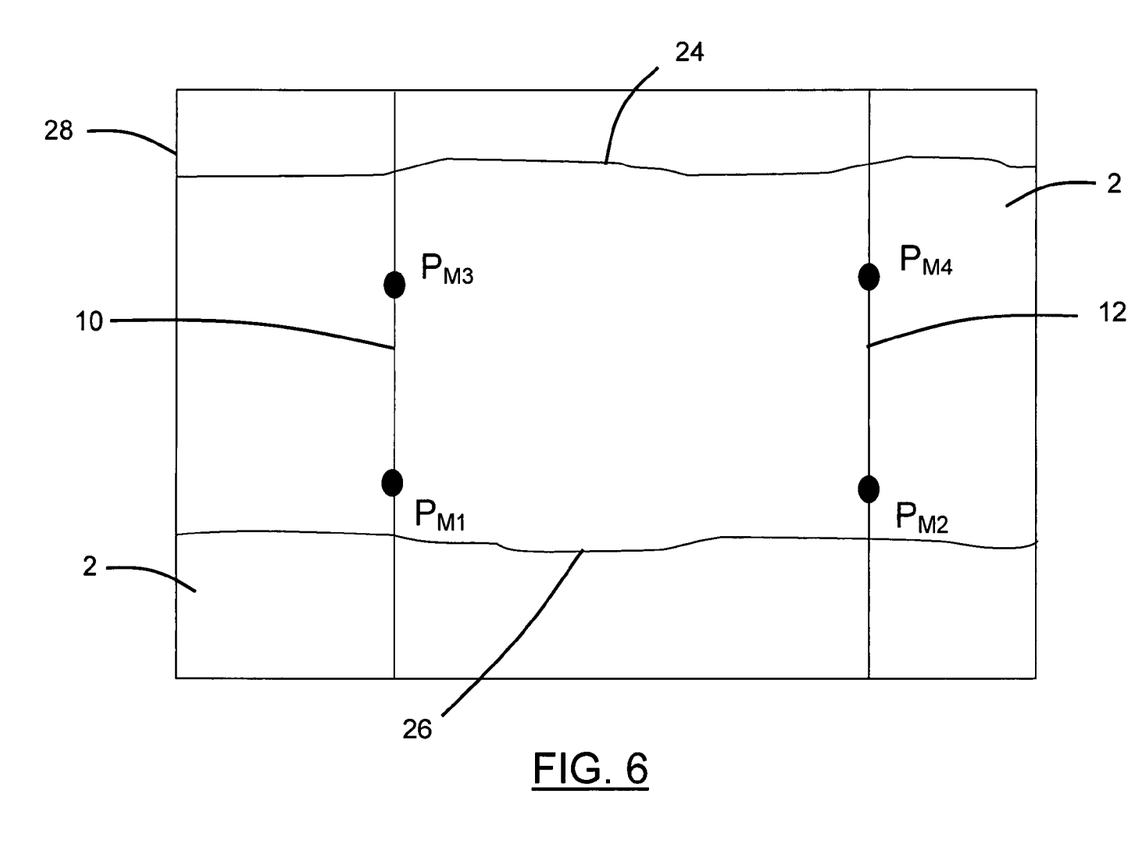
FIG. 6 is a schematic diagram illustrating an image captured by the measuring unit.

Referring to FIGS. 3 and 6, the camera 22 is configured to capture images 28 of the surface 2 containing lines 24, 26 resulting from an intersection of the light planes 18, 20 with the surface 2 and four reference points $P_{M1}$, $P_{M2}$, $P_{M3}$, $P_{M4}$ resulting from an intersection of the light planes 18, 20 with the wires 10, 12.

Figure 2:
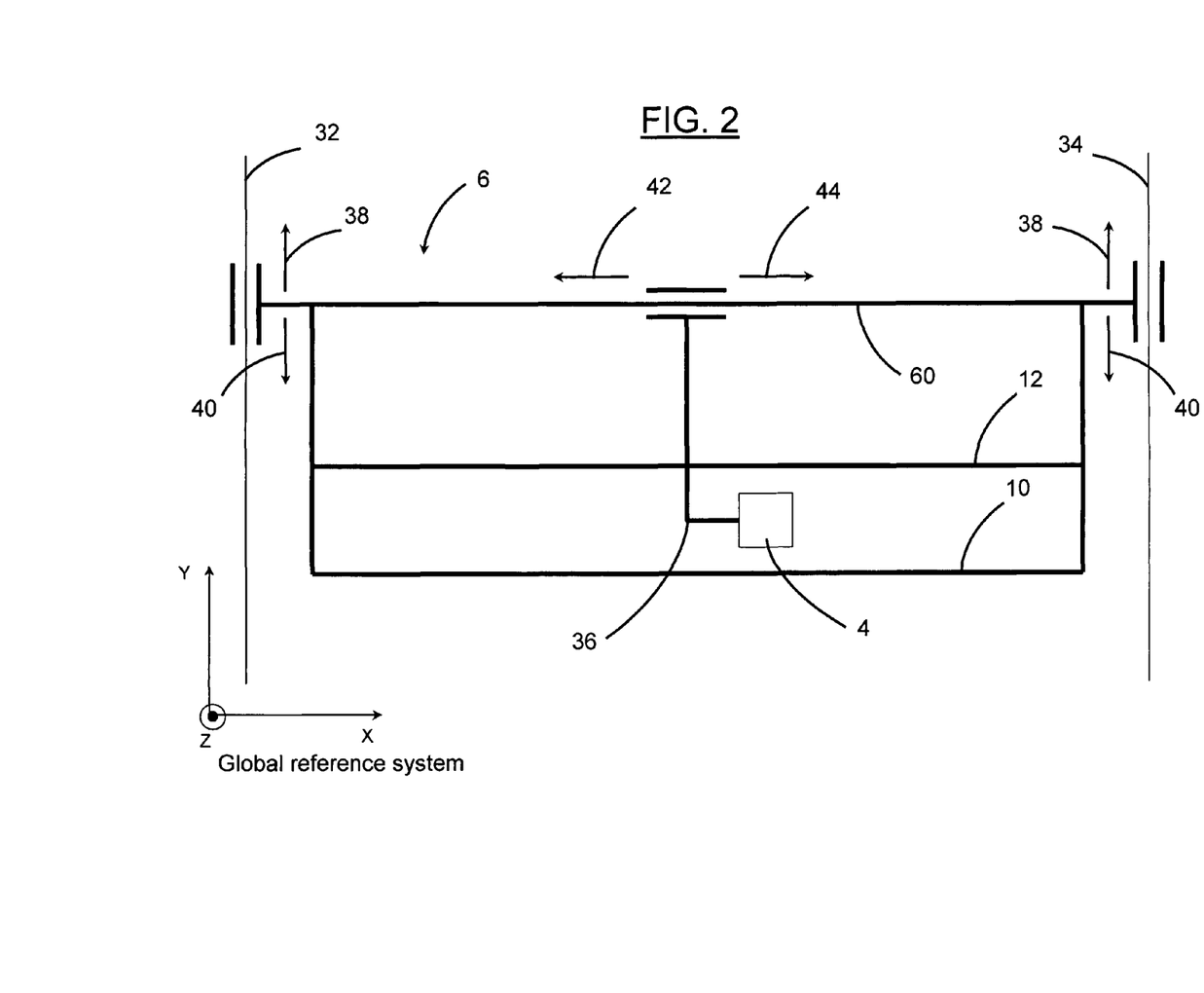
FIG. 2 is a schematic diagram illustrating a support assembly of the system.
Figure 8:
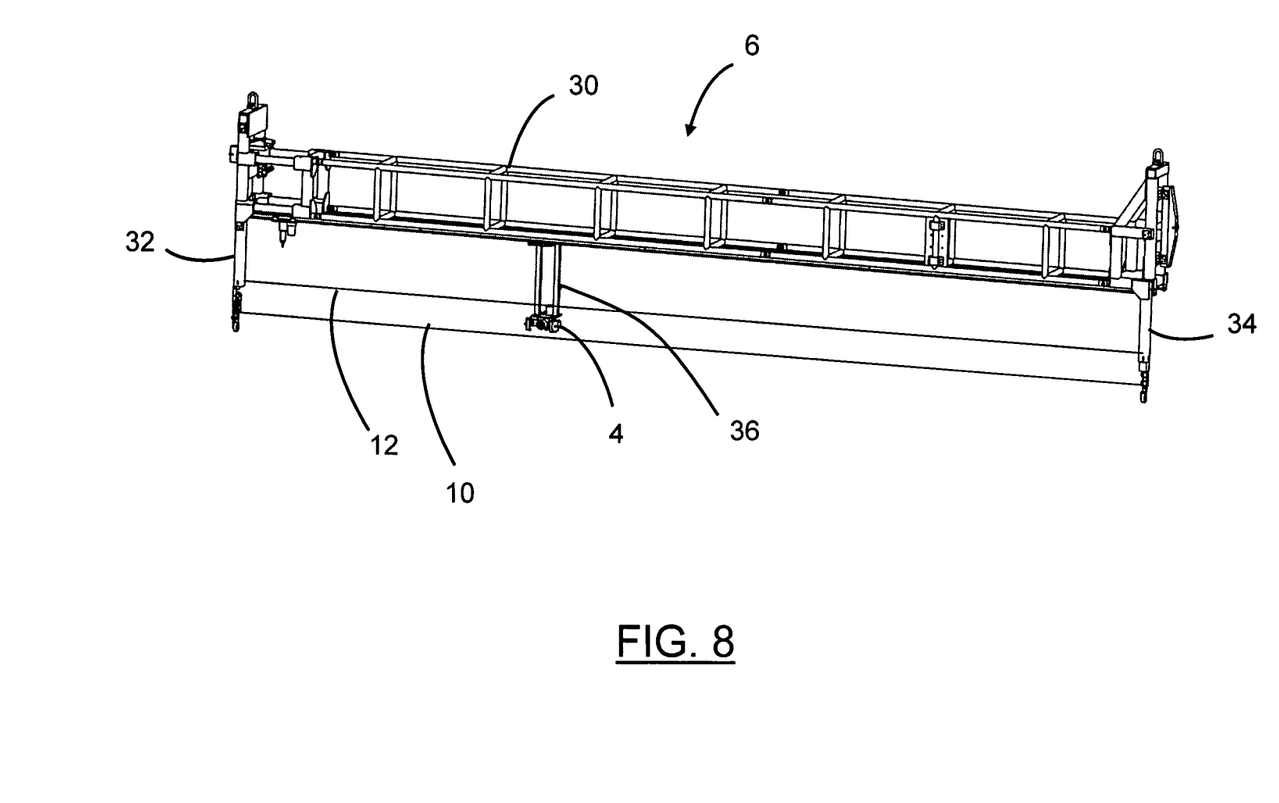
FIG. 8 is a schematic diagram illustrating a system mounted between rails of a dam gate.

Referring to FIGS. 2 and 8, the support assembly 6 carrying the measuring unit 4 may take the form of a frame comprising a mobile element 36 such as an arm to which the measuring unit 4 is attached, and a set of transverse and vertical guiding elements 30, 32, 34 for the mobile element 36. The support assembly 6 is thus capable of controllably moving the measuring unit 4 in front of the surface 2 (shown in FIG. 3) so as to progressively scan the surface 2 (in part or completely). The mobile assembly may take various forms, provided that its construction allows reaching the surface 2 to be inspected and controllably moving the measuring unit 4 in front of the surface 2 to build up the depth map of the surface 2. For example, the transverse guiding element 30 may be made of a rigid lattice as shown in FIG. 8, slideably mounted on lateral guides 32, 34 forming the vertical guiding elements, to allow moving the lattice 30 vertically (or in an equivalent direction depending on the situation/orientation of the surface to be examined) with respect to the surface 2 as depicted by the arrows 38, 40 (shown in FIG. 2). The arm 36 is slideably mounted on the lattice 30 to allow moving it horizontally (or in an equivalent direction depending on the situation/orientation of the surface to be examined) with respect to the surface 2 as depicted by the arrows 42, 44 (shown in FIG. 2).

Figure 9:
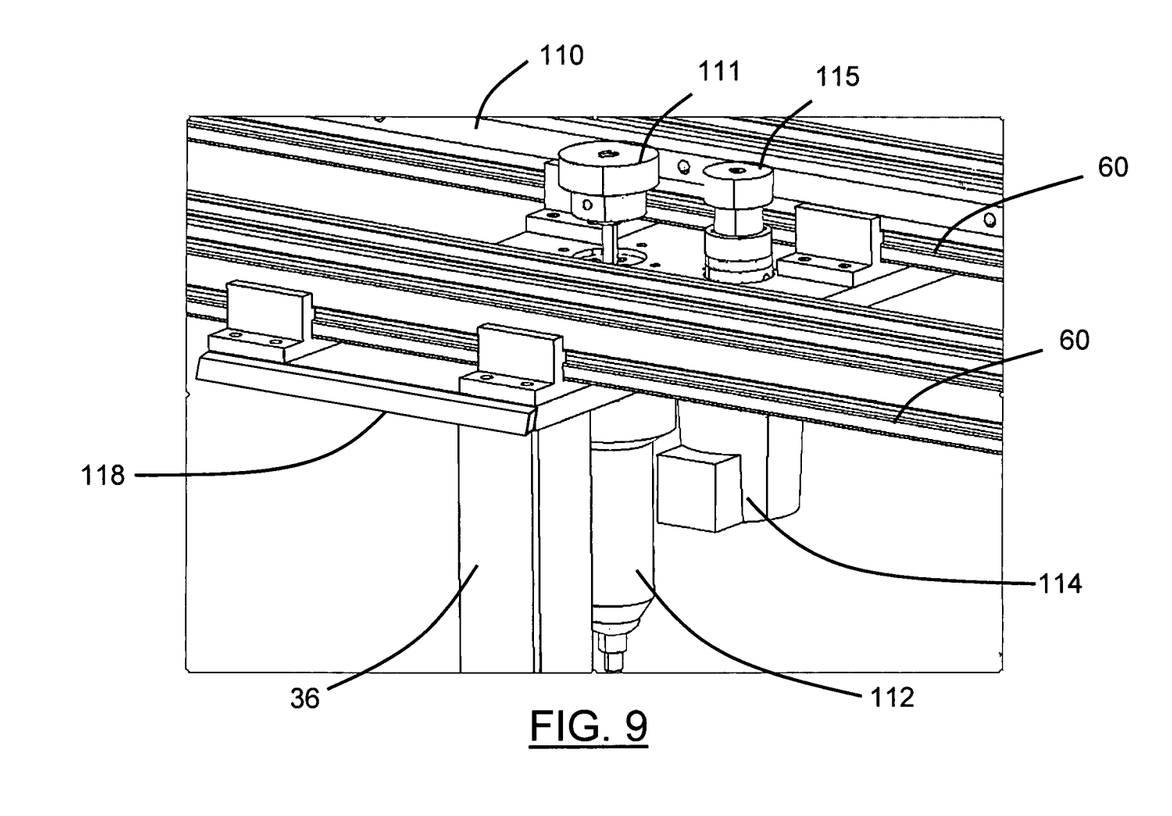
FIG. 9 is a schematic diagram illustrating a displacement system for a measuring unit of the system.

Referring to FIG. 9, the sliding of the arm 36 with respect to the lattice 30 (shown in FIG. 8) to position and move the measuring unit 4 (shown in FIG. 8) may be achieved by means of gearings driven by one or several motors mounted or not on the frame 6 depending on the type of motor—pneumatic, electric, hydraulic, etc. For example, a submersible electric rotary motor 112 provided with a pinion 111 engaging a rack 110 may be used to move the arm 36 along a rail arrangement 60. Preferably, the mobile element 36 will provide a precise positioning to the measuring unit 4. For example, a submersible rotary optical encoder 114 provided with a pinion 115 engaging the rack 110 may be used to measure the horizontal displacement of the mobile element 36. A proportional control unit may then control the position of the mobile element 36. In order to correct the position of the measuring unit 4 due to the inclination of the frame 6, a submersible inclinometer 118 measuring the inclination according to two degrees of liberty with respect to the horizontal may be used.

Figure 4:
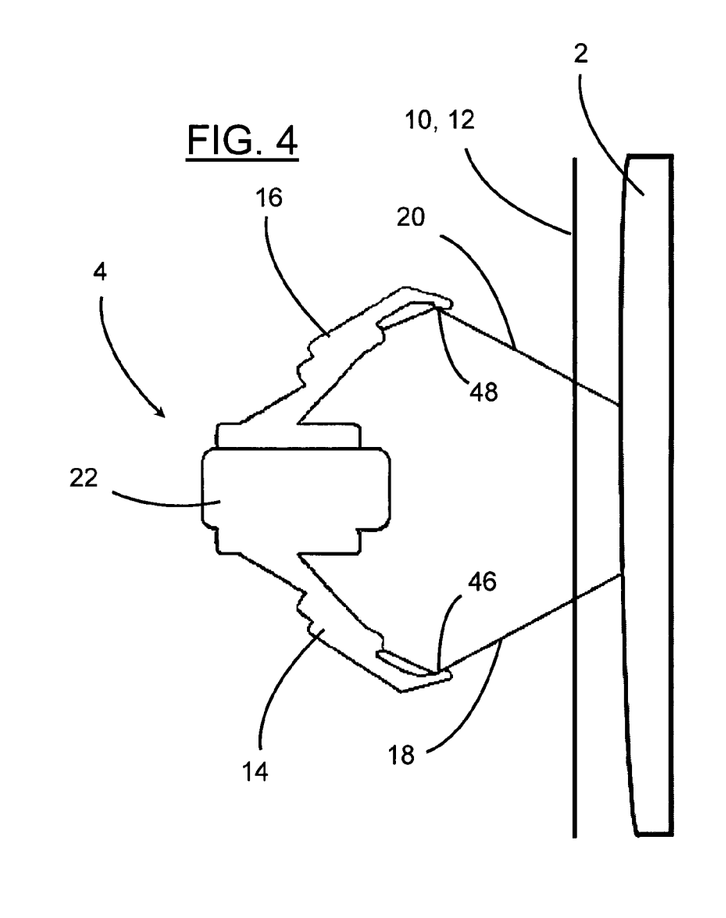
FIG. 4 is a schematic diagram illustrating a top view of a measuring unit of the system.
Figure 5:
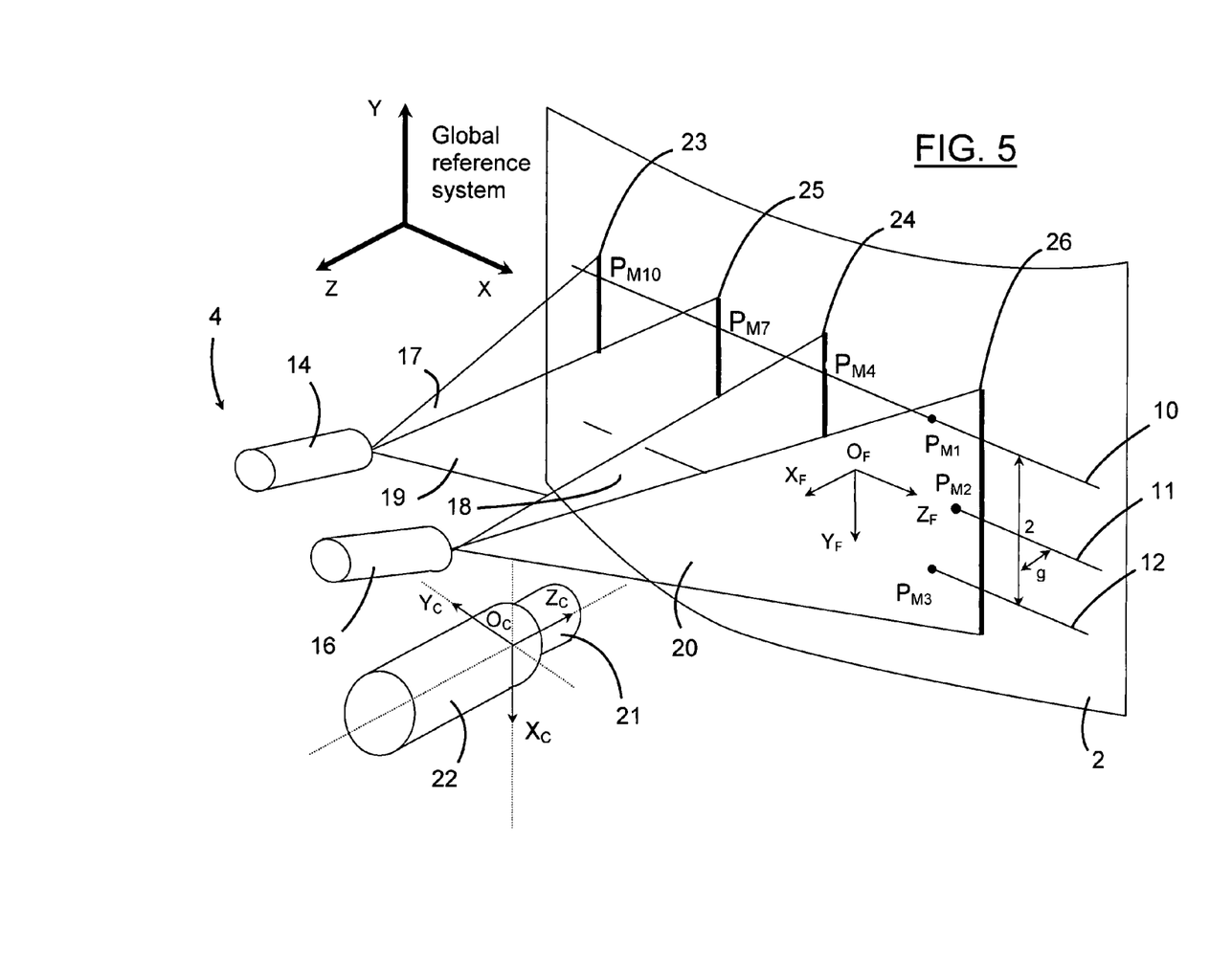
FIG. 5 is a schematic diagram illustrating an alternate configuration of a measuring unit of the system.

Referring to FIG. 4, the lasers 14, 16 of the measuring unit 4 are rigidly secured to the camera 22. Mirrors 46, 48 may be used to redirect the light planes 18, 20 toward the surface 2 depending on the chosen setup. Furthermore, the lasers 14, 16 may be disposed on a same side of the camera 22. Such an arrangement, shown in FIG. 5, allows reducing the size of the measuring unit 4. A single laser may also be used instead of two. In such a case, an appropriate optical arrangement (not shown) may be used to produce the two light planes 14, 16. Or, the light planes 14, 16 may be produced one after the other, so as to appear in subsequent images captured by the camera 22 and then processed in order to take this factor into account. It is also possible to use more than two laser projectors. In the case where n laser projectors are used, the intersection of the n light planes with the wires 10, 12 produces 2n points $P_{mi}$. Likewise, a laser projector may project several light planes on the surface 2 lighting as many points $P_{mi}$. FIG. 5 shows an arrangement of the measuring unit 4 where the laser projectors 14, 16 respectively project the light planes 17, 19 and 18, 20, lines 23, 25 and 24, 26 then resulting from the intersection of the light planes 17, 19 and 18, 20 with the surface 2.

The wires 10, 12 may be formed of steel wires or other types of wires if desired.

Referring to FIG. 5, it is also possible to use more than two wires, for example three wires 10, 11, 12 disposed in front of the surface 2, so that the light planes 24, 26 cross them. The extra wire or wires may be in the same plane as the wires 10, 12 and parallel to the wires 10, 12, or they may be in another plane, preferably parallel to the plane formed by the wires 10, 12, and still parallel to the wires 10, 12. The addition of extra wires provides more information for the position tracking of the measuring unit 4 and the on-line calibration of its parameters.

In order for the measuring unit 4 to self-track and map the surface 2, at least four points $P_{M1}$, $P_{M2}$, $P_{M3}$, $P_{M4}$ on the wires 10, 12 are lit by the laser arrangement 14, 16. An extra point on the wire 11 located at a distance g, which is not necessarily known, from the reference surface formed by the wires 10, 12 allows on-line calibrating the set of parameters of each light planes 18, 20.

Referring back to FIG. 1, the processing unit 8 may be embodied so as to build up a depth map of the surface 2 by means of an iterative and feedback process. For this purpose, the processing unit 8 comprises a tracking module 81, a mapping module 82 and a decision module 83. The tracking module 81 determines the location of the measuring unit 4 with respect to a fixed global reference system. The mapping module 82 determines the 3D coordinates of points on the surface 2 in the reference system bound to the camera 22 (shown in FIG. 3) of the measuring unit 4. The decision module 83 determines the commands to transmit to the support 6 that moves the measuring unit 4 in order to efficiently collect the data.

The tracking module 81 comprises two modeling sub-modules 56, 58, an estimation sub-module 812, a $P_{Mi}$ points detection sub-module 810 and a distortions correction sub-module 811. The modeling sub-module 56 models the support assembly 6 by means of a set of parametric data that characterize it. Likewise, the modeling sub-module 58 models the measuring unit 4 by means of a set of parametric data that characterize it. The $P_{Mi}$ points detection sub-module 810 determines the image coordinates of the points $P_{M1}$, $P_{M2}$, $P_{M3}$, $P_{M4}$. The distortions correction sub-module 811 corrects the image coordinates of the detected points in order to cancel the effect of the distortions of the lens 21 of the camera 22 or to take into account an out-of-parallelism defect of the wires 10, 12 (shown in FIG. 3). The estimation sub-module 812 estimates the pose (i.e. the position and orientation) of the measuring unit 4 with respect to the global reference system based on the signals provided by the modeling sub-module 58 and the distortions correction sub-module 811, and corrects the internal parameters of the measuring unit 4 through a feedback loop. The estimation sub-module 812 may use a Kalman filter to perform the desired estimation.

Referring to FIG. 3, the parametric data of the measuring unit 4 comprise the internal and external parameters of the camera 22, the parameters of the light planes 18, 20 and the spacing of the wires 10, 12. In the case where a perspective camera model with distortions is used, the typical internal parameters of the camera are then the focal lengths $\alpha_u, \alpha_v$, the main point $c_0 = [u_0, v_0]^T$ and the distortion coefficients of the lens 21. The typical external parameters of the camera 22 are the orientation and the position with respect to the reference system bound to the wires 10, 12. The light planes 18, 20 are defined by the parameters a, b, c, d in the equation in Cartesian coordinates: aX+bY+cZ+d=0. The parameter that defines the spacing of the wires 10, 12 is marked 2h. Finally, the parametric data of the support assembly 6 (shown in FIG. 2) typically comprise the position and the orientation with respect to a fixed global reference system as well as the position of the measuring unit 4 on the transverse rail arrangement 60 (shown in FIG. 9).

Referring back to FIG. 1, the mapping module 82 comprises a $P_u$ points detection sub-module 820 that determines the image coordinates of the points contained in the lines 24, 26, a distortions correction sub-module 811 similar to that of the tracking module 81, and a triangulation sub-module 822. The function of the triangulation sub-module 822 is to compute the 3D coordinates of the points $P_u$ in the reference system bound to the camera 22 of the measuring unit 4. The mapping module 82 also comprises a reference change sub-module 840 that transforms the coordinates of the points $P_u$ from the reference system bound to the camera toward the global reference system, and a surface modeling sub-module 54 that progressively builds up the map of the surface 2. There are numerous ways to represent the structural surface 2. For example, the surface modeling sub-module 54 may contain a set of 3D points that form the map of the surface 2 and define its tridimensional cartography.

The decision module 83 comprises a decision taking sub-module 830 that transmits positioning commands to the support assembly 6 and a communication interface 832 allowing initializing the processing unit 8 and retrieving the information sought, namely the map of the surface 2, the position and orientation data of the support assembly 6, and the parametric data of the measuring unit 4.

Through the wires 10, 12 (shown in FIG. 3), the measuring unit 4 of the system may be located with a great precision. The system also maps at the same time at least one line of points of the surface 2 by the use of a single image. For that, the camera 22 transmits the images 28 to the processing unit 8. The processing unit 8 processes the images 28 so as to locate the measuring unit 4 with respect to the reference system bound to the wires 10, 12 and so as to determine the coordinates of 3D points of the surface 2. The image coordinates of the points $P_{M1}$, $P_{M2}$, $P_{M3}$, and $P_{M4}$ are used to locate the measuring unit 4 while the lines 24, 26 are used to map the surface 2. The system according to the invention thus allows mapping surfaces of great length while preserving a high precision.

Referring also to FIGS. 2 and 3, the decision sub-module 83 initially transmits positioning commands to the support assembly 6 in order to position the measuring unit 4 at the level of the surface 2 to be inspected. When the measuring unit 4 is at the desired height, the decision sub-module 83 locks the displacement of the support assembly 6. The estimation sub-module 812 (e.g. Kalman filter) then corrects the internal operating parameters of the measuring unit 4 such as the parameters of the laser planes 18, 20. Then, the decision sub-module 83 transmits positioning commands to the support assembly 6 to move the measuring unit 4 crosswise (in the directions of arrows 42, 44 shown in FIG. 2) along the surface 2 in order to measure the 3D coordinates of the points contained in the lines 24, 26 of the surface 2. The mapping module 82 takes measurements at specified intervals via the communication interface 832. For each pair of lines 24, 26, an image is transmitted by the camera 22 to the mapping module 82. The surface modeling sub-module 54 builds up the map of the surface 2 line by line. The obtained map covers a strip of the surface 2 having a certain height. If several strips are required to map the whole or a desired part of the surface 2, then the decision module 83 transmits positioning commands to the support assembly 6 in order to move the measuring unit 4 heightwise toward the next adjoining area and then the above process is repeated.

The displacement of the measuring unit 4 may be made in a continuous mode or step by step. In the case of a continuous displacement, a single measurement for a given point of the surface 2 is taken by the tracking module 81 and by the mapping module 82. In the case of a step by step displacement, several measurements may be taken at each stop and may be combined so as to increase the confidence in the measurements.

In operation, the mapping system is likely to be subjected to multiple perturbations. Although it might be possible to directly take measurements of the structural surface 2 and then to reference these measurements using the position data of the measuring unit 4 and of the support assembly 6, these measurements are imprecise, or even false, due to the perturbations met. The system takes advantage of the wires 10, 12 through an iterative and feedback process, implemented in the tracking module 81, which ensures the validity of the position data of the measuring unit 4. This iterative and feedback process uses the model of the measuring unit 4 defined in the sub-module 58. Its role is to predict which will be the position of the points $P_{M1}$, $P_{M2}$, $P_{M3}$, and $P_{M4}$ in the image 28 based on the position and the orientation of the measuring unit 4, the internal parameters of the measuring unit 4 and the spacing of the wires 10, 12.

The minimal set of data for computing the pose of a camera without ambiguity is with four coplanar points. The $P_{Mi}$ points detector 810 determines the image coordinates of the points $P_{M1}$, $P_{M2}$, $P_{M3}$, and $P_{M4}$. The determination of the coordinates of the points $P_{M1}$, $P_{M2}$, $P_{M3}$, and $P_{M4}$ may be achieved using computer vision library algorithms. The distortions corrector 811 corrects these coordinates to cancel the effect of the possible distortions of the lens 21 of the camera 22. The points $P_{M1}$, $P_{M2}$, $P_{M3}$, and $P_{M4}$ are then triangulated in the reference system bound to the camera 22 in order to obtain their 3D coordinates. Equation 1 may be used for this purpose:

$$\begin{bmatrix} X \\ Y \\ Z \end{bmatrix}_{CAM} = \begin{bmatrix} (u-u_0)Z/\alpha_u \\ (v-v_0)Z/\alpha_v \\ -d/(a+b(u-u_0)/\alpha_u+c(v-v_0)/\alpha_v) \end{bmatrix}_{CAM} \quad (1)$$

where (u, v) represent the image coordinates of a point P, and (X, Y, Z) represent the 3D coordinates of P in the reference system bound to the camera 22. The orientation of the camera may be computed using the algorithm proposed by B. K. P. Horn in the paper "Closed-form solution of absolute orientation using unit quaternions", Journal of the Optical Society of America A, Vol. 4, pages 629-642, 1987, with the 3D coordinates of the points $P_{M1}$, $P_{M2}$, $P_{M3}$, and $P_{M4}$ as input data. But other methods working on a set of 4 coplanar points may also be used. Once the orientation of the camera has been computed, the translation may be computed following the equation 2:

$$\text{Trans}(FILS,CAM) = -\text{Rot}(FILS,CAM)[\bar{P}_{Mi}]_{CAM} \quad (2)$$

where Trans(FILS, CAM) denotes the translation of the camera 22 with respect to the wires 10, 12, Rot(FILS, CAM) denotes the orientation of the camera 22 with respect to the wires 10, 12 and $[\bar{P}_{Mi}]_{CAM}$ denotes the baric center of the points $P_{M1}$, $P_{M2}$, $P_{M3}$, and $P_{M4}$ expressed in the reference system of the camera 22. The position/orientation of the camera 22 thus computed comes as initial parameter of the Kalman filter 812 that refines the estimate of this position/orientation based on the parametric data of the model of the measuring unit 4 provided by the sub-module 58, the model of the support assembly 6 provided by the sub-module 56, and the computed pose. After several iterations of the Kalman filter 812, if the difference between the coordinates of the points $P_{M1}$, $P_{M2}$, $P_{M3}$, et $P_{M4}$ estimated by the model of the measuring unit 4 and the coordinates of the points $P_{M1}$, $P_{M2}$, $P_{M3}$, and $P_{M4}$ detected by the $P_{Mi}$ points detector 810 is above a certain threshold, then the pose is rejected. Otherwise, the computed pose is valid. The use of this technique allows having a more robust and uncorrupted system. It is made possible by the presence of the wires 10, 12. This technique thus allows detecting if the wires 10, 12 are moving in response to perturbations or also if the parametric data of the model of the measuring unit 4 are false.

In the case where re-estimation of the parameters a, b, c, d of the laser planes 18, 20 is also desired, the third wire 11 (shown in FIG. 5) is used. These parameters are estimated by the Kalman filter 812 which has the position and the orientation of the camera 22 and the parameters a, b, c, d of the laser planes 18, 20 as state vector. The $P_{Mi}$ points detector 810 determines the image coordinates of the points $P_{M1}$, $P_{M2}$, $P_{M3}$, $P_{M4}$, $P_{M5}$, $P_{M6}$ that are transmitted to the distortions corrector 811 and then to the Kalman filter 812. The position of the third wire 11 with respect to the wires 10, 12 is not necessarily known and may also be estimated by the Kalman filter 812.

The $P_{Li}$ points detector 820 determines the 2D coordinates of points of the images 28 contained in the lines 24, 26. This processing step may be achieved using computer vision library algorithms. The distortions corrector 811 then corrects the coordinates of the points $P_{Li}$ so as to cancel the effect of possible distortions of the lens 21 of the camera 22. In the case of a continuous displacement, the 3D coordinates of the points $P_{Li}$, expressed in the reference system bound to the measuring unit 4, are determined from a single measurement by the triangulation sub-module 822 which uses the equation 1. In the case of a step by step displacement, it is possible, for example, to work out the average of the points $P_{Li}$ measured several times by the sub-modules 820, 811 and 822. A change of reference system 840 is then achieved to obtain the coordinates of $P_u$ in the global reference system. The reference change may be achieved following the equation:

$$\begin{bmatrix} X \\ Y \\ Z \\ 1 \end{bmatrix}_{GLOBAL} = T(\text{GLOBAL, CAM}) \begin{bmatrix} X \\ Y \\ Z \\ 1 \end{bmatrix}_{CAM} \quad (3)$$

where T is a homogenous transformation matrix that is function of the orientation and of the position of the camera 22 with respect to the global reference system.

The positioning of the measuring unit 4 on the support assembly 6 may be performed by the decision taking sub-module 830 in order to be able to control the positioning as function of the processed measurements. For example, it may be possible that the system encounters perturbations (for example, motions of the wires 10, 12) and is no longer able to take measurements. The decision taking sub-module 830 may in that case stop the displacement of the measuring unit 4 until the perturbations disappear. The positioning may also be pre-programmed so as to be achieved without feedback. Or an operator may take control of the displacements via the communication interface 832.

The lines 24, 26 may be indexed by means of an optical encoder 114 (shown in FIG. 9) that provides the position of the measuring unit 4 on the transverse rail arrangement 60 of the support assembly 6 (shown in FIG. 2). The index of the lines 24, 26 corresponds to the position of the measuring unit 4 on the rail arrangement 60 of the support assembly 6.

The configuration of the tracking, mapping and decision modules 81, 82, 83 may be adapted for example to refine certain processings in order to produce the mapping data or according to the operating parameters and the type of equipment forming the measuring unit 4 and the support assembly 6.

Figure 7:
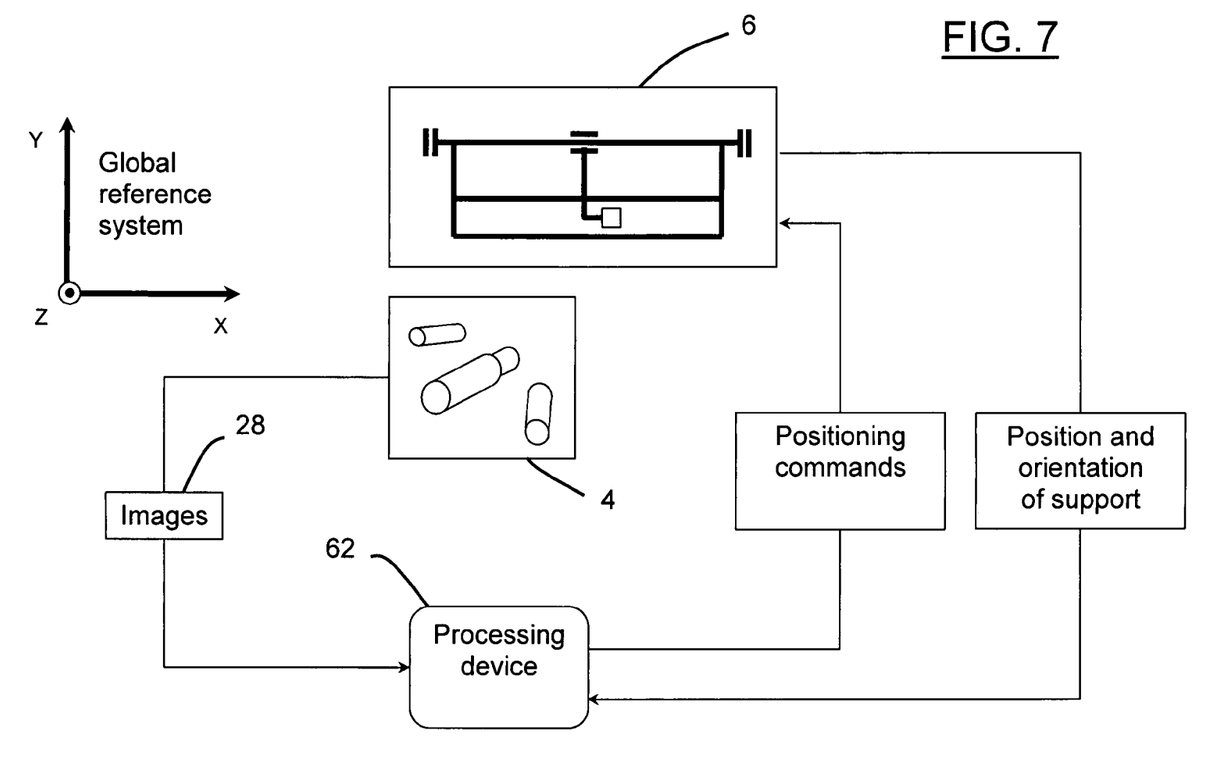
FIG. 7 is a schematic diagram illustrating an acquisition chain of the system.

Referring to FIG. 7, the processing unit 8 and the communication interface 832 (shown in FIG. 1) may advantageously be implemented in a processing device 62 such as a PC (computer) or appropriate dedicated circuits controlling the functions of the system. The processing device 62 is connected to the measuring unit 4 and retrieves the images 28 from the camera 22 (shown in FIG. 2) and processes them to locate the measuring unit 4 and map the surface 2. The processing may be achieved in continuous mode at the refresh rate of the camera 22. The processing device 62 may also control the two displacement axes of the support assembly 6. During a translation of the measuring unit 4 along the horizontal axis (arrows 42, 44 in FIG. 3) and at specified intervals, the processing device 62 retrieves the position (X, Y) of the measuring unit 4 and stores a profile line in memory. This information is used to express the coordinates of the laser lines in a global reference system bound to the scene.

Referring back to FIG. 3, in order to be able to detect surface defects of the inspected structure of reduced sizes (0.1 mm for example), the camera 22 is preferably provided with a high resolution progressive CCD matrix. Such a camera may communicate with the processing device 62 (shown in FIG. 7) via a digital transmission channel such as IEEE-1394 (also known under the denomination FireWire), Camera Link, USB or Gigabyte Ethernet. The laser projectors 14, 16 preferably emit at a wavelength in the visible range (between 400 nm and 800 nm). To facilitate the detection of the lines 24, 26 in the image 28, the lens 21 of the camera 22 may use an optical filter that let only the wavelength of the laser projectors 14, 16 through.

Although the system is designed to operate underwater, it may also be used outside of water if desired. In such a case, the calibration of the measuring unit 4 is simply made outside of water, and the system then works in the same way as underwater.

While embodiments of the invention have been illustrated in the accompanying drawings and described above, it will be evident to those skilled in the art that modifications may be made therein without departing from the invention.

The invention claimed is:

1. A system for tridimensional cartography of a structural surface, comprising:
   two wires extendable along the structural surface while being spaced from each other so as to define a reference surface in front of the structural surface;
   a measuring unit comprising a laser arrangement configured to project two distinct light planes directed toward the structural surface and intersecting with the wires at an intersection, and a camera configured to capture images of the structural surface containing lines resulting from an intersection of the light planes with the structural surface and reference points resulting from the intersection of the light planes with the wires;
   a support assembly configured to controllably move the measuring unit in front of the structural surface so as to progressively scan the structural surface to be mapped; and
   a processing unit for processing the images captured by the camera, the processing unit having:
      a processing circuit that determines an orientation and a position of the measuring unit with respect to the reference surface as function of the reference points in the images;
      a processing circuit that determines 3D coordinates of points defining the lines in the images with respect to a reference system bound to the measuring unit determined as function of the orientation and the position of the measuring unit; and
      a processing circuit that transforms the 3D coordinates into cartographic data representative of the structural surface in a global reference system bound to the reference surface defined by the wires.

2. The system according to claim 1, wherein the support assembly comprises a frame having a mobile element to which the measuring unit is attached, and an arrangement of transverse and vertical guiding elements for the mobile element.

3. The system according to claim 2, wherein the arrangement of guiding elements comprises lateral guides spaced from each other and configured to extend in front of the structural surface, a transverse element slideably mounted on the lateral guides and slideably receiving the mobile element, and an arrangement for displacement of the mobile element with respect to the transverse element and of the transverse element with respect to the lateral guides.

4. The system according to claim 3, wherein the wires extend between the lateral guides.

5. The system according to claim 1, wherein the laser arrangement comprises two lasers attached to the camera.

6. The system according to claim 1, further comprising an extra wire extendable along the structural surface so that the light planes cross the extra wire, and wherein the processing unit further has a processing circuit that calibrates parameters of the light planes as function of a reference point in the images captured by the camera corresponding to an intersection of one of the light planes with the extra wire.

7. The system according to claim 1, wherein:
 the processing circuit that determines the orientation and the position comprises a tracking module having:
  a support assembly modeling sub-module that models the support assembly through a set of parametric data characterizing the support assembly;
  a measuring unit modeling sub-module that models the measuring unit through a set of parametric data characterizing the measuring unit;
  a sub-module for detection of the reference points in the images, that determines the image coordinates of the reference points;
  a distortions correction sub-module that corrects the image coordinates of the reference points based on the parametric data characterizing a distortion relative to the measuring unit; and
  an estimation sub-module that estimates the position and the orientation of the measuring unit in the global reference system based on the parametric data characterizing the measuring unit and the corrected image coordinates, and corrects the parametric data characterizing the measuring unit based on the estimated position and the orientation of the measuring unit; and
 the processing circuit that determines the 3D coordinates of the points and the processing circuit that transforms the 3D coordinates comprise together a mapping module having:
  a sub-module for detection of points defining the lines in the images, that determines image coordinates of the points defining the lines;
  a distortions correction sub-module that corrects the image coordinates of the points defining the lines based on the parametric data characterizing the distortion relative to the measuring unit;
  a triangulation sub-module that determines the 3D coordinates of the points defining the lines from the reference system bound to the measuring unit;
  a reference change sub-module that transforms the 3D coordinates of the points defining the lines from the reference system bound to the measuring unit toward the global reference system to produce the mapping data; and
  a structural surface modeling module that builds up a map of the surface based on to the mapping data.

8. The system according to claim 7, wherein the processing unit further comprises a decision module having:
 a decision taking sub-module connected to the support assembly modeling sub-module and to the support assembly, the decision taking sub-module transmitting positioning commands to the support assembly based on the mapping data in the surface map; and
 a communication interface configured to receive operating data directed to the processing unit and to transmit the map of the surface, data representative of the position and orientation of the measuring unit and the parametric data characterizing the measuring unit.

9. A method for tridimensional cartography of a structural surface, comprising the steps of:
 a) extending two wires along the structural surface while spacing them from each other so as to define a reference surface in front of the structural surface;
 b) controllably moving a measuring unit comprising a laser arrangement and a camera in front of the structural surface so as to progressively scan the structural surface;
 c) projecting two distinct light planes directed toward the structural surface using the laser arrangement;
 d) capturing images of the structural surface containing lines resulting from an intersection of the light planes with the structural surface and four reference points resulting from an intersection of the light planes with the wire using the camera;
 e) determining an orientation and a position of the measuring unit with respect to the reference surface as function of the reference points in the images;
 f) determining 3D coordinates of points defining the lines in the images with respect to a reference system bound to the measuring unit determined as function of the orientation and the position of the measuring unit; and
 g) transforming the 3D coordinates into cartographic data representative of the structural surface in a reference system bound to the reference surface defined by the wires.

10. The method according to claim 9, wherein the step of moving comprises a transmission of positioning commands directed to move the measuring unit based on the mapping data gathered.

11. The method according to claim 9, wherein the laser arrangement is rigidly secured to the camera.

12. The method according to claim 9, further comprising the steps of:
 extending an extra wire along the structural surface so that the light planes cross the extra wire; and
 calibrating parameters of the light planes as function of a reference point in the images captured by the camera corresponding to an intersection of one of the light planes with the extra wire.

13. The method according to claim 9, wherein the wires extend close to the structural surface and in parallel with each other, the reference surface being planar.

14. The method according to claim 9, wherein the step of determining the orientation and the position of the measuring unit comprises the sub-steps of:
 modeling a support assembly configured to controllably move the measuring unit in front of the structural surface by a set of parametric data characterizing the support assembly;
 modeling the measuring unit by a set of parametric data characterizing the measuring unit;
 detecting the reference points in the images and determining image coordinates of the reference points;
 correcting the image coordinates of the reference points based on the parametric data characterizing a distortion relative to the measuring unit;
 estimating the position and the orientation of the measuring unit in the global reference system based on the parametric data characterizing the measuring unit and the corrected image coordinates; and correcting the parametric data characterizing the measuring unit based on the estimated position and orientation of the measuring unit.

15. The method according to claim 9, wherein the step of determining the 3D coordinates of the points defining the lines in the images comprises the sub-steps of:

detecting the points defining the lines in the images and determining image coordinates of the points defining the lines;

correcting the image coordinates of the points defining the lines based on the parametric data characterizing a distortion relative to the measuring unit; and determining by triangulation the 3D coordinates of the points defining the lines in the reference system bound to the measuring unit.

16. The method according to claim 9, wherein the step of transforming comprises the sub-steps of:

producing the mapping data by transformation of the 3D coordinates of the points defining the lines from the reference system bound to the measuring unit toward the global reference system; and building up a map of the surface based on the mapping data.

* * * * *